US006986240B2

(12) United States Patent
Kallevig

(10) Patent No.: US 6,986,240 B2
(45) Date of Patent: Jan. 17, 2006

(54) RESILIENT DISCHARGE DEFLECTING CHUTE

(75) Inventor: Jeffrey B. Kallevig, Eden Prairie, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 10/444,663

(22) Filed: May 22, 2003

(65) Prior Publication Data

US 2004/0231311 A1 Nov. 25, 2004

(51) Int. Cl.
*A01D 67/00* (2006.01)

(52) U.S. Cl. ........................................ 56/320.2; 56/200

(58) Field of Classification Search ............... 56/320.2, 56/202, 295, 255, 16.6
See application file for complete search history.

(56) References Cited

U.S. PATENT DOCUMENTS 2,756,556 A * 7/1956 Watkins ........................ 56/189
3,400,523 A 9/1968 Klingofstrom et al.
3,503,194 A 3/1970 Ritums ......................... 56/255
3,568,421 A * 3/1971 Smith et al. .................. 56/255
3,646,739 A 3/1972 Dahl .......................... 56/320.1
3,648,445 A 3/1972 Efflandt ...................... 56/320.2
3,760,572 A * 9/1973 Marion et al. ............. 56/320.2
3,805,499 A * 4/1974 Woelffer et al. .............. 56/202
4,008,559 A 2/1977 Lessig, III et al. ........ 56/320.2
4,142,351 A 3/1979 Neice et al. .................. 56/202
4,258,539 A 3/1981 Pearce et al. .............. 56/320.2
4,322,938 A 4/1982 Efflandt ..................... 56/320.2
4,502,271 A 3/1985 Hansen et al. ............. 56/320.1
4,672,799 A 6/1987 Parish ......................... 56/17.4
5,101,617 A 4/1992 Hare et al. ................... 56/17.4
5,195,311 A 3/1993 Holland ...................... 56/320.2
5,331,794 A 7/1994 Reichle ....................... 56/17.4
5,491,964 A 2/1996 Butler ........................ 56/320.2
5,992,135 A 11/1999 Benway ..................... 56/320.2

OTHER PUBLICATIONS

The University of Georgia Research Foundation, Inc., UGARF CASE 950: "New Design for Mower Discharge Guard/Outlet Chute," dated Jun. 13, 2001.

* cited by examiner

*Primary Examiner*—Árpád Fábián Kovács
(74) *Attorney, Agent, or Firm*—Fulbright & Jaworski L.L.P.

(57) ABSTRACT

A resilient and flexible discharge deflecting chute for a lawn mower deck. A discharge deflecting chute utilizing a flexible sheet shaped into a chute-like form by a frame. A flexible, resilient discharge deflecting chute has memory characteristics and returns to shape even after substantial deflection from obstacle contact. Preferably, a flexible, resilient material selected for this discharge deflecting chute has sufficient stiffness to substantially maintain its shape in normal operation. The flexible, resilient material selected for this discharge deflecting chute has sufficient flexibility to deflect substantially when contacted by obstructions during mowing operations.

10 Claims, 3 Drawing Sheets

RESILIENT DISCHARGE DEFLECTING CHUTE

TECHNICAL FIELD

This invention generally relates to a cutting unit for a turf mower. More particularly, the invention relates to a deflector assembly in selective communication with turf clippings dispersed from the cutting unit of a turf mower.

BACKGROUND OF THE INVENTION

Turf cutting equipment, such as rotary mowers, have a cutting deck carrying one or more turf cutting implements within a cutting chamber. Open access to the cutting chamber may be provided to allow for wide dispersal of grass clippings. Side discharge mowers have an access provided at a laterally disposed side of the cutting deck and are often equipped with a discharge deflecting chute to keep debris thrown from the mower blade at a very low altitude. Known discharge deflecting chute may be formed from metal or plastic parts. These discharge chutes are generally rigid and may be damaged during use from contact with obstacles. Additionally, debris may be deflected off the interior surfaces of the chute and thrown away from the mower at an undesirable trajectory.

A common problem associated with some typical discharge deflecting chutes is that they interfere with convenient operation of the mower. Common discharge deflecting chutes are often damaged during use due to contact with obstacles. Additionally, these discharge chutes can inflict damage to trees, signposts, and other structures during contact. Areas of turf unevenness may additionally be damaged by the rigid discharge deflecting chutes contacting and scraping the turf to reveal bare soil.

It is desirable to provide a mower deck which includes a side discharge chute that directs clippings during operation in the side discharge mode. It would also be desirable for such a mower to provide or hinder the chute from becoming permanently bent, deformed or warped when the discharge chute contacts obstacles. It would also be desirable for such a mower to provide or hinder the chute from causing damage to items the chute may come into contact with during operation or transport of the mower.

SUMMARY OF THE INVENTION

The present invention is directed to a resilient and flexible discharge deflecting chute. One embodiment of the present invention utilizes a reinforced sheet rubber form which is shaped into a chute shape by a frame. In a preferred embodiment, a flexible, resilient discharge deflecting chute is provided which has memory characteristics and returns to shape even after substantial deflection from obstacle contact. The flexible, resilient material selected for this discharge deflecting chute has sufficient stiffness to substantially maintain its shape in normal operation. The flexible, resilient material selected for this discharge deflecting chute has sufficient flexibility to deflect substantially when contacted by obstructions. The flexible, resilient material selected for this discharge deflecting chute has sufficient resiliency to substantially return to its normal shape after contact and deformation by an obstacle.

Additional embodiments of the present invention include variations in construction and materials selection. The present invention may be produced as an injection molded resilient and flexible material of equivalent flexural and resiliency characteristics. Furthermore, the frame utilized to control the shape of a rubber sheet may be substantially reproduced in alternate form to provide the same function. The present invention may be produced as an injection molded resilient material of equivalent flexural and resiliency characteristics, with integral rigid plastic or steel portions to control the shape and mounting structure of the discharge deflecting chute.

Another benefit of the present deflecting chute is that the resilient and flexible material may absorb a greater amount of the kinetic energy of thrown debris as compared to known generally rigid metal or plastic deflecting chutes. A variety of flexible and resilient sheet materials may be utilized to form the discharge chute of the present invention. In a preferred embodiment, the discharge deflecting chute comprises a fiber-reinforced rubber sheet.

One object of the present invention is to provide an improved grass deflector attachment for a rotary lawn mower which is durable and which is inexpensive and easily manufactured.

A method of providing a discharge chute is also disclosed to include the steps of providing a sheet element and deforming the sheet element into a chute-like shape with a frame. The frame preferably includes a U-shaped plate which engages the sheet element to generate a chute-like form. In one embodiment, a pair of plates are provided which engage the sheet element in a clamping manner. Alternative embodiments may include more than two plates or elements which engage the sheet element to form the chute shape.

In accordance with these objects and other advantages which will become apparent hereinafter, the instant invention will now be described with particular reference to the accompanying drawings.

BRIEF DESCRIPTION OF THE DRAWINGS

This invention will be described hereafter in the Detailed Description, taken in conjunction with the following drawings, in which like reference numerals refer to like elements or parts throughout.

DETAILED DESCRIPTION

Figure 1:
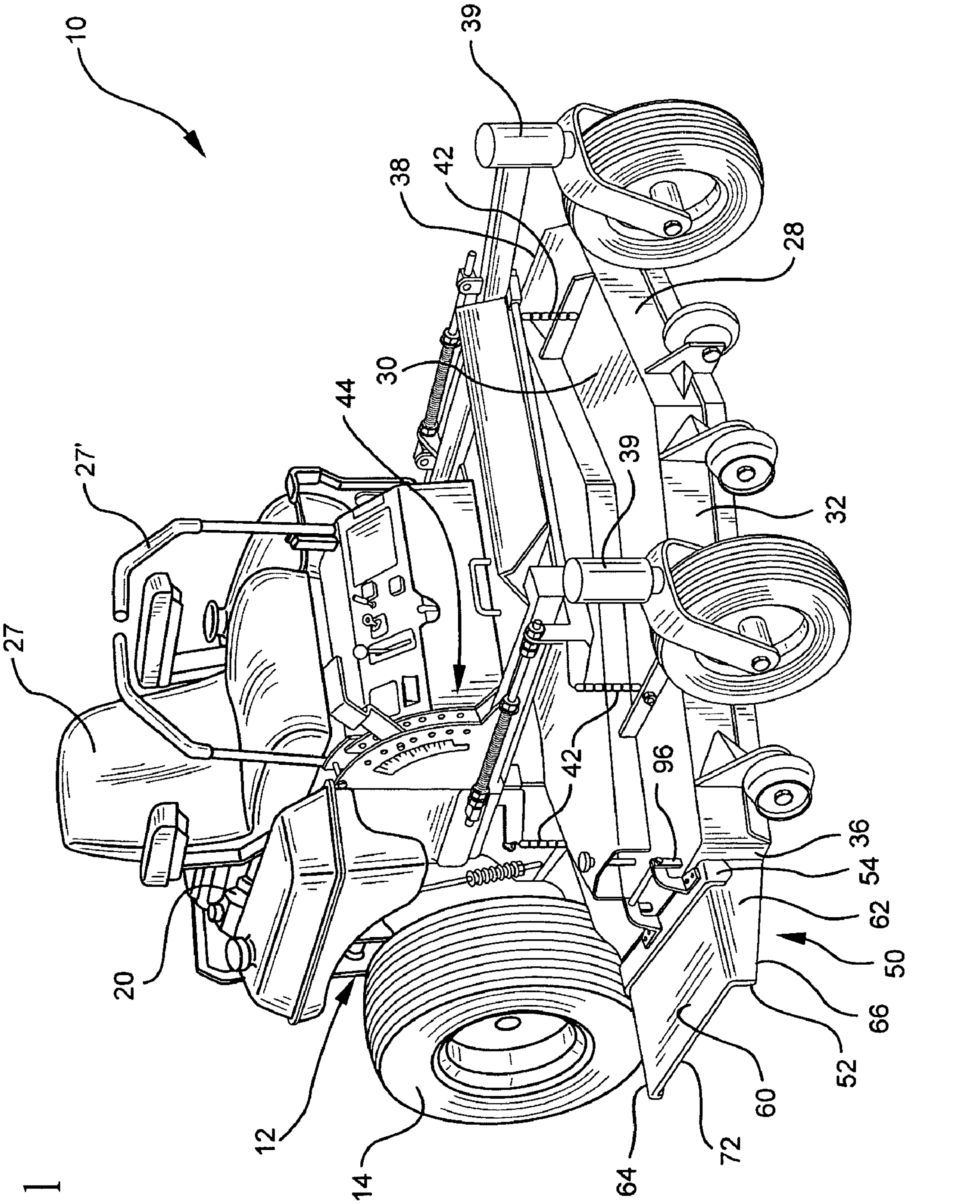
FIG. 1 is a perspective view of a mower incorporating to the invention.

The mower of this invention is referred to generally by the reference numeral 10 and is seen to be a riding lawn mower in the drawings. Although the invention described herein is ideally suited for use with a riding mower, it is believed that the invention described herein also has applicability with respect to walk-behind mowers. Mower 10 includes a frame 12 having a pair of drive wheels 14 positioned on opposite sides of the frame means 12 at the rearward end of the mower. An internal combustion engine 20 is mounted on frame 12. Engine 20 is operatively connected to a pair of hydraulic pumps which are operatively connected to hydraulic motors operatively connected to the drive wheels 14, respectively. Mower 10 also includes an operator's station 27 and steering controls 27'.

Mower 10 includes a mower deck 28 at the forward end thereof which includes a top wall 30, front wall 32, rear wall 34, and opposite side walls 36 and 38. Caster wheel assemblies 39 support the forward end of deck 28. A stabilizer rod assembly connects the rearward end of the mower deck 28 to the frame means 12 in conventional fashion. Mower deck 28 is supported by a plurality of chain members 42 which are connected to a mower deck height control mechanism generally referred to by the reference numeral 44 to enable the mower deck to be raised or lowered with respect to the frame means 12.

A rotary cutting unit is shown installed on a mower 10. Cutting deck 28 includes a downwardly facing cutting chamber which is defined by walls 32, 34, 36, and 38 that extends downwardly from top wall 30. As is well known in rotary cutting decks, this wall arrangement provides a generally enclosed cutting chamber which is enclosed over the sides and top thereof but is open at the bottom thereof. Rotary cutting blades are carried inside this cutting chamber and rotate in a generally horizontal cutting plane about a generally vertical rotational axis. Each rotary cutting blade has sharpened cutting edges which cut the grass as blade rotates in its cutting plane. The height of cut is determined by how far the blades are positioned above the ground which is, in turn, determined by the relative position of cutting deck on roller frame. A means for rotating the cutting blade within cutting chamber is provided on cutting deck 28. This rotating means may comprise a pulley system. Alternatively, an individual electric or hydraulic motor may be utilized to power the cutting blades. Shroud wall 36 is provided with a grass discharge opening to allow grass clippings to exit through shroud wall 36 in some desired direction, i.e. to the side of cutting deck as shown in FIG. 1 or to the rear of cutting deck 28.

Figure 2:
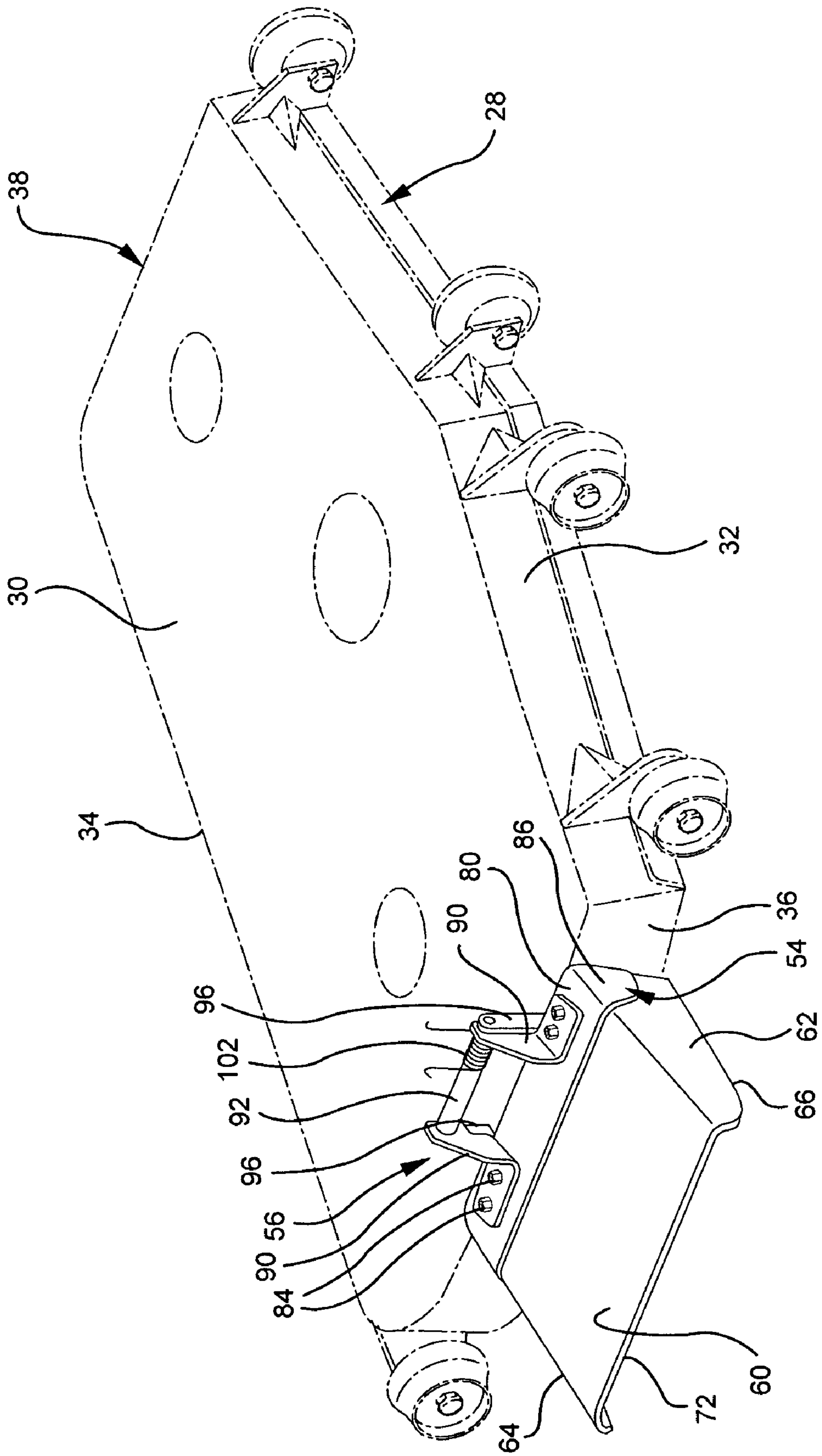
FIG. 2 is a perspective view of a rotary cutting unit on the mower of FIG. 1.
Figure 3:
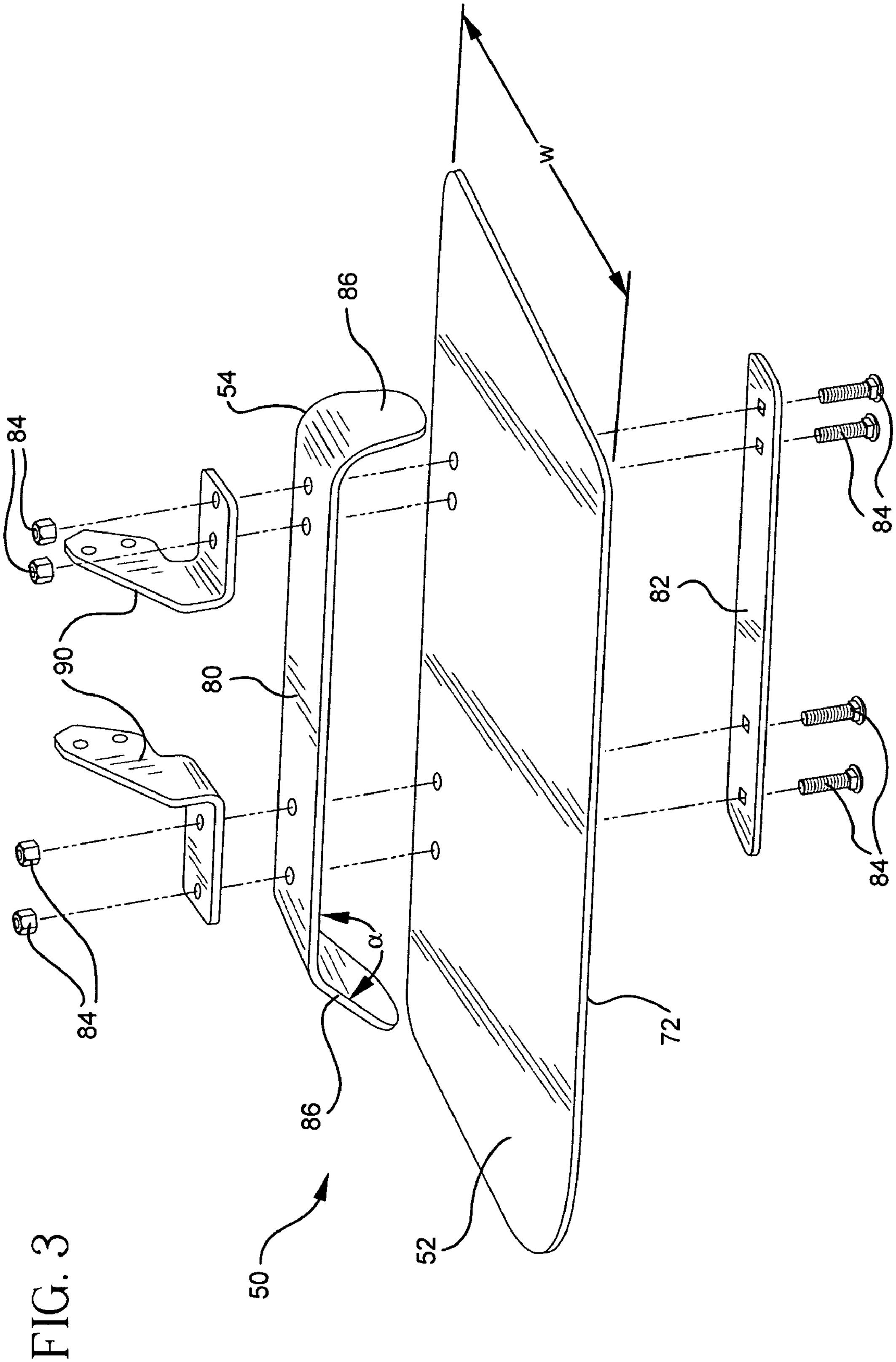
FIG. 3 is a perspective view of the components of a discharge deflecting chute of FIGS. 1 and 2.

Referring now to FIGS. 2 and 3, a discharge deflector assembly is indicated as numeral 50. Discharge assembly 50 includes a sheet 52 and a frame assembly 54 for deforming sheet 52 into a chute shape and for connecting sheet 52 to the cutting deck 28. Discharge assembly 50 is movably connected to mower deck 28 via a hinge connection 56 which permits the discharge assembly 50 to assume a guarded position as indicated in FIG. 2, and an unguarded position (not shown) where the discharge assembly 50 has pivoted away from the ground surface about a pivot axis. When in the guard position, discharge assembly 50 is generally aligned with side discharge opening so that clippings are directed through an interior region of discharge assembly 50.

Discharge assembly 50 includes a top surface 60 and a pair of side surfaces 62, 64. Top surface 60 is directed downwardly at an angle of approximately 5 degrees. Side surface 62 (which is in front of side surface 64 during operation) is generally perpendicular to top surface 60, while side surface 64 is provided at a backwardly directed angle relative to top surface 60 to facilitate dispersal of clippings. This angle which is greater than 90 degrees is indicated as "$\alpha$" in FIG. 3. Side surface 62 has a lower edge 66 which is substantially closer to the turf surface than a corresponding lower edge of side surface 64.

Sheet 52 is supported by frame assembly 54 on one end and is unsupported at a free end 72. Structural integrity is enhanced by formation of side surfaces 62, 64. Sheet 52 may be manufactured by a cutting a form out of a larger sheet of rubber material. Sheet 52 may be manufactured from a wide variety of natural and/or synthetic elastomeric products. A preferred material for sheet 52 is a rubber sheet having a thickness of approximately 0.3 inch, and being manufactured by Goodyear Manufacturing, Inc. Sheet 52 preferably has a width, W, of between 4 and 16 inches. Sheet 52 may have a total surface area of between 100 to 500 square inches. In a preferred embodiment, sheet 52 has a surface area of approximately 350 square inches. Sheet 52 may be selected from a variety of known resilient materials. Reinforced or laminated sheeting may be selected.

Sheet 52 is formed into its chute shape by engagement with plate elements 80, 82 of frame assembly 54. Plate element 80 is generally U-shaped while plate element 82 is generally planar. Sheet element 52 is retained between plate elements 80, 82 by fasteners 84. FIG. 3 illustrates the various components of discharge assembly 50 prior to assembly. As the plate elements 80, 82 are brought together during manufacture, sheet element 52 is formed into a predetermined shape by engagement with side elements 86 of plate element 80. Frame assembly 54 may be considered a forming element for imparting a shape upon sheet element 52. In a preferred embodiment, frame assembly 54 provides a clamping assembly for engaging and forming sheet element 52 into its chute shape.

Frame assembly 54 includes a pair of frame arms 90 each connected at one end to plate element 80. Hinge connection 56 includes frame arms 90, pin 92 and cutting deck supports 96. A biasing element 102, here in the form of a torsion spring, provides a force tending to bias the deflector assembly into the guard position as indicated in FIGS. 2 and 3. If the discharge assembly 50 contacts an obstruction during mowing operations, hinge connection 56 allows discharge assembly 50 to pivot upward. Once discharge assembly 50 is clear of the obstruction biasing element 102 helps return the chute into its guard position.

The term "frame" as used herein and in the appended claims is to be defined in the broadest sense. For example, the "frame" as used herein means a structure used to shape and support the resilient sheet 52 of the present invention. A frame may assume a variety of different shapes, e.g. the frame be generally U-shaped or L-shaped. A frame utilized in the present invention may or may not include planar sections, e.g., sections of the frame could be curved in form yielding a corresponding curved portion of the attached resilient sheet. A frame may be manufactured of a variety of materials, including but not limited to metals, plastics, composites, etc. Preferably, a frame is of a rigid metal (rigid, relative to the resilient chute). A frame may comprise a single part or multiple parts. Sections of the frame may be selectively movable relative to other sections of the frame, e.g. a frame may include two or more parts which are hinged together. In an illustrated embodiment, frame 54 is used to shape and support sheet 52 proximate to one end of sheet 52. In alternative embodiments, frame 54 may include additional supporting elements which extend outwardly away from deck 28. In such an alternative embodiment, frame 54 may include elements which engage top surface 60 and/or a bottom surface opposite the top surface. Frame 54 in alternative embodiments may have elements which pass through other apertures of sheet 52. Frame 54 may include elements at which sheet 52 is adhesively secured thereto. One of ordinary skill in the arts would appreciate that a variety of different frame 54 devices or assemblies would be practicable to implement the present invention.

Other variants are possible without departing from the scope of the present invention. For example, more than one sheet element 52 may be utilized, or the frame 54 may be differently configured to impart a different shape to the discharge chute. Thus, the scope of this invention is to be limited only by the appended claims.

I claim:

1. A discharge deflector assembly comprising:

a generally flat sheet element of elastomeric material;

an intermediate frame of substantially non-deformable material engaging the sheet element and elastically deforming the sheet element from a generally flat sheet form into a geometry defining a top surface and at least one side surface upon connection of the sheet element to the intermediate frame; and a movable connection for coupling the sheet element and intermediate frame to a mower deck, said movable connection providing the sheet element in either a guarded position or an unguarded position.

2. The deflector assembly of claim 1 having a top surface and a pair of side surfaces, each side surface downwardly depending from the top surface.

3. The deflector assembly of claim 2 wherein each of the pair of side surfaces includes a lower edge, and wherein distances between the lower edges and a ground surface are different.

4. The deflector assembly of claim 2 wherein the pair of side surfaces have substantially different surface areas.

5. The deflector assembly of claim 2 wherein one of the pair of side surfaces is generally perpendicular to a ground surface and the other one of the pair of side surfaces is substantially non-perpendicular to the ground surface.

6. The deflector assembly of claim 1 wherein the intermediate frame includes a configured plate which engages the sheet.

7. The deflector assembly of claim 6 wherein the configured plate is generally U-shaped.

8. The deflector assembly of claim 1 wherein the intermediate frame is pivotally connected to the mower deck.

9. The deflector assembly of claim 7 wherein the intermediate frame pivots about an axis defined at a distance substantially away from a top surface of the mower deck.

10. The deflector assembly of claim 1 further comprising a biasing element providing a force tending to align an interior region of the sheet with the side discharge opening of the mower deck.

* * * * *